United States Patent
Jiang et al.

(10) Patent No.: US 12,497,312 B2
(45) Date of Patent: Dec. 16, 2025

(54) REFRACTORY ORGANIC POLLUTANTS WITH PHOTO- EXCITED HOLES AS ELECTRON ACCEPTORS

(71) Applicant: NANJING UNIVERSITY OF SCIENCE AND TECHNOLOGY, Nanjing (CN)

(72) Inventors: Xinbai Jiang, Nanjing (CN); Hefei Shi, Nanjing (CN); Jinyou Shen, Nanjing (CN); Dan Chen, Nanjing (CN); Cheng Hou, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 602 days.

(21) Appl. No.: 17/798,210

(22) PCT Filed: Dec. 3, 2020

(86) PCT No.: PCT/CN2020/133548
§ 371 (c)(1),
(2) Date: Aug. 8, 2022

(87) PCT Pub. No.: WO2022/016768
PCT Pub. Date: Jan. 27, 2022

(65) Prior Publication Data
US 2023/0119366 A1    Apr. 20, 2023

(30) Foreign Application Priority Data

Jul. 22, 2020  (CN) .......................... 202010711300.6

(51) Int. Cl.
*C02F 3/28*   (2023.01)
*C02F 101/36* (2006.01)
(Continued)

(52) U.S. Cl.
CPC .............. *C02F 3/2853* (2013.01); *C25D 9/08* (2013.01); *C02F 2101/36* (2013.01); *C02F 2101/38* (2013.01); *C02F 2305/10* (2013.01)

(58) Field of Classification Search
CPC ...... C02F 3/28; C02F 1/46; C02F 1/32; C02F 3/106; C02F 3/2806; C02F 3/2853;
(Continued)

(56) References Cited

U.S. PATENT DOCUMENTS

2013/0017415 A1 * 1/2013 He .......................... H01M 8/16
429/2
2014/0209479 A1 * 7/2014 Hoffmann ............. C02F 1/4674
204/278
(Continued)

FOREIGN PATENT DOCUMENTS

CN       105428663 A  *  3/2016    ................ C02F 3/34
CN       108686645 A     10/2018
(Continued)

OTHER PUBLICATIONS

Hou et al, CN 109092319 English machine translation, pp. 1-7 (Year: 2018).*
Chen et al, CN 105428663 English machine translation, pp. 1-6 (Year: 2016).*

*Primary Examiner* — Claire A Norris

(57) ABSTRACT

The present invention relates to the technical field of wastewater treatment, and discloses a method for enhanced biotreatment of refractory organic pollutants with photo-excited holes as electron acceptors. The method comprises the following steps: 1) placing a composite semiconductor-coated carrier material into a reactor, introducing wastewater into the reactor inoculated with anaerobic sludge, and allowing the composite semiconductor-coated carrier material to be immersed in the wastewater, wherein the composite semiconductor-coated carrier material comprises a conductive carrier and composite semiconductor materials loaded
(Continued)

on the conductive carrier; 2) carrying out habituated culture on the anaerobic sludge for a period of time, and loading a biological membrane on the surface of the composite semiconductor materials, to construct a photo-excited hole enhanced bioreactor; and 3) treating the refractory pollutants in the wastewater by utilizing the reactor under irradiation.

7 Claims, 3 Drawing Sheets

(51) Int. Cl.
  *C02F 101/38* (2006.01)
  *C25D 9/08* (2006.01)
(58) Field of Classification Search
  CPC .............. C02F 2101/36; C02F 2101/38; C02F 2305/10; C25D 9/08
  See application file for complete search history.

(56) References Cited

U.S. PATENT DOCUMENTS

| | | | |
|---|---|---|---|
| 2015/0068906 A1* | 3/2015 | Curran | B01J 37/348 |
| | | | 205/108 |
| 2020/0165148 A1* | 5/2020 | Liu | H01M 4/8825 |

FOREIGN PATENT DOCUMENTS

| | | | | |
|---|---|---|---|---|
| CN | 109092319 A | * | 12/2018 | ............ B01J 23/888 |
| CN | 110093257 A | | 8/2019 | |
| CN | 110550721 A | | 12/2019 | |
| CN | 111146004 A | | 5/2020 | |
| CN | 111762880 A | | 10/2020 | |
| KR | 20150139429 A | | 12/2015 | |
| WO | 2017019146 A1 | | 2/2017 | |

* cited by examiner

REFRACTORY ORGANIC POLLUTANTS WITH PHOTO- EXCITED HOLES AS ELECTRON ACCEPTORS

TECHNICAL FIELD

The present invention relates to the technical field of wastewater treatment, and discloses a method for enhanced bio-treatment of refractory organic pollutants with photo-excited holes as electron acceptors.

BACKGROUND

Due to the advantages like convenient operation, low cost and environmental friendliness, biological treatment technologies have been widely used in the field of industrial wastewater treatment. Aerobic biotechnology is one of the commonly used technologies for wastewater treatment, which has advantages such as high treatment efficiency, short degradation period, and good effluent quality. However, the industrial wastewater often contains high concentrations of pollutants, which are highly toxic and refractory to biodegradation. When industrial wastewater contains high concentrations of volatile organic compounds (VOCs), it not only easily causes the breakdown of the aerobic biological system, but also cause the pollutants to volatilize in the air. Anaerobic technology has the characteristics of high treatment load and strong load resistance, but the disadvantage of long degradation period limits its application and development. To solve the above problems, anoxic biotechnology, as an efficient biological treatment technology, is widely used in the field of wastewater treatment, in which organic pollutants are consumed as carbon sources and electron donors, and provide energy for microbial growth and metabolism. However, the anoxic technology requires appropriate and sufficient electron acceptors (e.g., $NO_3^-$) during the degradation process. The addition of electron acceptors in the practical wastewater treatment process will inevitably lead to an increase in the treatment cost. Therefore, it is an unavoidable problem to find a suitable and inexpensive electron acceptor in the further development of biotechnology in wastewater treatment.

In recent years, in order to improve the efficiency of conventional biological technology for wastewater treatment, the biological treatment technology has been coupled with advanced oxidation technology to construct novel coupling systems. For example, the semiconductor material was added into the biological system, and the semiconductor material was excited under light to generate photogenic electron hole pairs, which are used for REDOX reaction, and then strengthen the degradation of organic matter by organisms. Semiconductor materials have a wide application prospect in the fields of sterilization, sewage treatment and photohydrolysis of water to produce hydrogen due to their characteristics of converting light energy into chemical energy. Photo-excited holes, as electron acceptors in biodegradation, do not need additional addition and are ideal electron acceptors for enhancing anaerobic biodegradation. Up to now, many researchers have proved that semiconductor materials and microorganisms could coexist in the same system, and the synergistic effect of semiconductor materials and microorganisms could greatly enhance the degradation efficiency of pollutants in the system. This undoubtedly provides sufficient theoretical support for the construction of biological system strengthened by semiconductor materials.

Therefore, considering the shortcomings in the prior art described above, there is an urgent need to develop a new method for enhanced bio-treatment of refractory organic pollutants with photo-excited holes as electron acceptors.

SUMMARY

1. Problem to be Solved

The present invention aims to solve the problems of low efficiency, high cost, difficult catalyst recovery in traditional semiconductor photocatalysis technology, and low load of biodegradation technology in the treatment of refractory organic pollutants. In the present invention, semiconductor photocatalysis technology is coupled with biological treatment technology, and enhanced degradation of the organic pollutants in the wastewater is realized by utilizing the synergistic reaction of semiconductors material and microorganisms. Photo-excited holes were acted as electron acceptors to enhance the degradation of organic pollutants in a biological system, and also the holes could be continuously consumed as electron acceptors in the biodegradation process, to avoid the recombination of photo-excited electrons and holes. This improves the reaction efficiency at the semiconductor interfaces, and promotes the degradation of organic pollutants in the system.

2. Technical Solution

To solve the above problems, the following technical solution is adopted in the present invention.

The present invention provides a method for enhanced bio-treatment of refractory organic pollutants with photo-excited holes as electron acceptors. The method comprises the following steps:

1-1) placing a composite semiconductor-coated carrier material into a reactor, introducing wastewater into the reactor inoculated with anaerobic sludge, and allowing the composite semiconductor-coated carrier material to be immersed in the wastewater, wherein the composite semiconductor-coated carrier material comprises a conductive carrier and composite semiconductor materials loaded on the conductive carrier;

1-2) carrying out habituated culture on the anaerobic sludge for a period of time, and loading a biological membrane on the surface of the composite semiconductor materials, to construct a photo-excited hole enhanced bioreactor; and 1-3) treating the refractory pollutants in the wastewater by utilizing the reactor under irradiation.

The conductive carrier has a high surface area, good physical and chemical stability, is nontoxic and harmless, and has good biocompatibility. The composite semiconductor materials are loaded on the conductive carrier to promote the establishment of a coupling interface between the composite semiconductor materials and microorganisms, and avoid the loss of semiconductor materials and decrease in catalytic performance. If the composite semiconductor materials are added directly, the problems of deactivated catalytic activity of the semiconductor material and difficulty in recycling are caused.

According to a preferred embodiment, the conductive carrier includes carbon paper or carbon felt. The conductive carrier needs to have a certain thinness. If the conductive carrier is too thick, excess semiconductor materials tend to deposit on the conductive carrier, resulting in increased cost and reduced utilization of semiconductor materials. If the conductive carrier is too thin, the conductive carrier is caused to have a too low mechanical strength, and thus cannot withstand the impact of water flow.

According to a preferred embodiment, the composite semiconductor coated carrier material includes any one of $BiVO_4/FeOOH@CP$ (carbon paper), $CdS/g-C_3N_4@GF$ (graphite felt), or $BiVO_4/g-C_3N_4@GF$.

According to a preferred embodiment, the reactor comprises a quartz reactor or a glass reactor. For the sake of better light transmittance, the quartz reactor is preferred. The light source providing visible light includes a light source that can be natural light or that can be simulated visible light, including LED light and Xenon light.

According to a preferred embodiment, the composite semiconductor coated carrier material is $BiVO_4/FeOOH@CP$. The $BiVO_4/FeOOH@CP$ is prepared through a method comprising: preparing $BiOI@CP$ by electrodeposition, converting $BiOI@CP$ into $BiVO_4@CP$, immersing $BiVO_4@CP$ in a solution of $FeCl_3 \cdot 6H_2O$ for a period of time, and rinsing with deionized water, to obtain $BiVO_4/FeOOH@CP$.

According to a preferred embodiment, the sludge is inoculated at a concentration of about 3.0-6.0 g/L, and the anaerobic sludge is subjected to habituated culture for at least 30 days.

According to a preferred embodiment, the electrodeposition comprises the following steps:

Dissolving $Bi(NO_3)_3 \cdot 5H_2O$ and KI in deionized water; adjusting the pH with nitric acid, and mixing the solution with a solution of p-benzoquinone in ethanol for a period of time, to obtain a mixture; and Adding the mixture to a three-electrode system, electrodepositing at a cathodic potential for a period of time, to deposit BiOI onto carbon paper, so as to form $BiOI@CP$.

According to a preferred embodiment, the $BiOI@CP$ is converted into $BiVO_4@CP$ through a step comprising:

Coating a $VO(acac)_2/DMSO$ solution onto $BiOI@CP$, heating to a certain temperature at a certain heating rate and holding for a period of time, and treating with NaOH to remove excess $V_2O_5$, to obtain $BiVO_4@CP$.

According to a preferred embodiment, the wastewater contains refractory organic pollutants, $Na_2HPO_4 \cdot 12H_2O$, $KH_2PO_4$, $MgSO_4 \cdot 7H_2O$, $CaCl_2$, and a mixed solution of trace elements.

According to a preferred embodiment, the refractory organic pollutants include nitrogen-containing heterocyclic organic compounds (such as pyridine), chlorinated organic compounds (such as chlorophenols) and antibiotic organic compounds (such as tetracyclines).

In the embodiments, pyridine is used as a target pollutant, because pyridine, as a solvent and intermediate, is widely used in pharmaceuticals, insecticides, paints, dyestuffs, explosives and petrochemicals. Therefore, pyridine is often contained in industrial wastewater. Pyridine adversely affects human health and environmental quality due to its toxicity and teratogenicity, and is thus listed as a priority pollutant by the U.S. Environmental Protection Agency. Once industrial wastewater containing pyridine is discharged into the environment without treatment, there will be an irreversible consequence. Therefore, there is an urgent need to develop an efficient and economical treatment method to remove pyridine from wastewater.

According to a preferred embodiment, in the present invention, a 150 mL quartz reactor (4.5×4.5×7.5 cm) is used for the habituated culture of microorganisms and degradation of organic pollutants, and a 150 W LED light is used as a visible light source. Carbon paper (CP, 4×4 cm) is used as the conductive carrier material, and the $BiVO_4/FeOOH$ semiconductor material is immobilized on the carbon paper carrier.

According to a preferred embodiment, the $BiVO_4/FeOOH@CP$ is prepared through a method comprising the following steps:

Dissolving 1.94 g of $Bi(NO_3)_3 \cdot 5H_2O$ and 6.64 g of KI into 100 mL of deionized water, adjusting the pH to 1.7 with nitric acid, and mixing the solution with 40 mL of a solution of p-benzoquinone in ethanol (0.23 M) for 5 min;

Adding the mixture to a three-electrode system, and electrodepositing for 10 min at a cathodic potential of −0.1 V (vs. Ag/AgCl), to electrodeposit BiOI onto CP;

Then coating 1 mL of $VO(acac)_2/DMSO$ solution onto $BiOI@CP$, heating to 450° C. at a heating rate of 2° C./min for 2 hrs, and treating for 30 min with 10 M NaOH to remove excess $V_2O_5$, to obtain $BiVO_4@CP$; and further immersing $BiVO_4@CP$ in a 5 mM $FeCl_3 \cdot 6H_2O$ solution for 12 hrs, and then rinsing with deionized water, to obtain $BiVO_4/FeOOH@CP$.

According to a preferred embodiment, the photo-excited hole enhanced bioreactor is specifically constructed through a method comprising: before the reactor starts, inoculating anaerobic sludge into a quartz reactor, at a mixed liquor suspended solid (MLSS) concentration of 3.0-6.0 g/L, and immersing and immobilizing the semiconductor materials in the reactor; after two days removing the supernatant, and then adding 125 mL of freshly prepared wastewater to the reactor to start a new batch, where after at least 30 days of habituated culture, a biological membrane is grown and enriched on the surface of the semiconductor material, and excess suspended sludge in the reactor is removed.

The simulated wastewater comprises the following components: organic pollutants, $Na_2HPO_4 \cdot 12H_2O$ 3.06 g/L, $KH_2PO_4$ 0.76 g/L, $MgSO_4 \cdot 7H_2O$ 0.2 g/L, $CaCl_2$ 0.05 g/L, 1 mL/L mixed solution of trace elements, including $ZnSO_4 \cdot 7H_2O$ 0.01 g/L, $MnCl_2 \cdot 4H_2O$ 0.003 g/L, $H_3BO_3$ 0.03 g/L, $CoCl_2 \cdot 6H_2O$ 0.02 g/L, $CuCl_2 \cdot 2H_2O$ 0.001 g/L, $NiCl_2 \cdot 6H_2O$ 0.002 g/L, and $Na_2MoO_4 \cdot 2H_2O$ 0.003 g/L, EDTA 0.5 g/L, and $FeSO_4 \cdot 7H_2O$ 0.2 g/L. The carbon and nitrogen needed for microbial growth and metabolism in the photo-excited hole enhanced biological system are provided by organic pollutants.

3. Beneficial Effects

Compared with the prior art, the present invention has the following beneficial effects.

(1) According to the method for enhanced bio-treatment of refractory organic pollutants with photo-excited holes as electron acceptors provided in the present invention, the $BiVO_4/FeOOH$ semiconductor material is immobilized on a conductive carrier by using an immobilization technology of semiconductor materials to construct a composite semiconductor-coated carrier material, and the biological membrane is loaded onto the surface of the composite semiconductor by habituated culture of anaerobic sludge, to allow the $BiVO_4/FeOOH$ semiconductor material to be effectively coupled to the biological system. Photo-excited holes act as electron acceptors to enhance the degradation of organic pollutants in the biological system; and as the photo-excited hole is consumed, the recombination of photo-excited electrons and holes would be effectively suppressed, thereby improving the catalytic efficiency, and achieving a synergistic catalytic effect of 1+1>2. In this way, the degradation efficiency of refractory organic pollutants by this system is significantly improved, pyridine in wastewater is removed efficiently, and excellent TOC removal and ammonia nitrogen formation are achieved. Thus, the present invention has a good prospect of application.

(2) According to the method for enhanced bio-treatment of refractory organic pollutants with photo-excited holes as electron acceptors provided in the present invention, the semiconductor material is not simply coupled to the biological treatment technology, instead the semiconductor material and the biological treatment technology act synergistically to improve the treatment capability of the device. The photo-excited holes as electron acceptors in the microbial degradation process not only improve the biodegradation effect, but also enhance the microbial activity, the stability and the impact resistance of the enhanced system. The photo-excited holes as electron acceptors are consumed during the biodegradation process and also effectively inhibit the photo-excited electron-hole recombination, thus greatly improving the reaction efficiency on the interface of the semiconductor material. This promotes the improvement of the overall degradation effect of the enhanced system.

(3) According to the method for enhanced bio-treatment of refractory organic pollutants in the present invention, photo-excited holes act as the electron acceptors to enhance the degradation of organic pollutants in the biological system; and no electron acceptors are needed to be additionally added, thus greatly saving the cost.

(4) According to the method for enhanced bio-treatment of refractory organic pollutants with photo-excited holes as electron acceptors provided in the present invention, different from traditional semiconductor materials, the semiconductor material used in the present invention has good stability and biocompatibility, and will not reduce the microbial activity, so the biological membrane can grow stably on the surface of the semiconductor material.

(5) According to the method for enhanced bio-treatment of refractory organic pollutants with photo-excited holes as electron acceptors provided in the present invention, the $BiVO_4$/FeOOH semiconductor material is immobilized on the carbon paper carrier by using the immobilization technology of semiconductor materials. Compared with traditional homogeneous technology, the problems of difficulty in recycling the semiconductor material, large dosage, and high cost are solved.

(6) According to the method for enhanced bio-treatment of refractory organic pollutants with photo-excited holes as electron acceptors provided in the present invention, the constructed photo-excited hole enhanced biological system has excellent load resistance, and the system will not break down even at a high concentration of pyridine, where the highest treatment load is as high as 2.34 mol $m^{-3} \cdot d^{-1}$. The load resistance of the photo-excited hole enhanced biological system allow the system to adapt to the complex and variable industrial wastewater, making it have great potential in the treatment of practical industrial wastewater.

In the figure, 1. LED light; 2. quartz reactor; 3. biological membrane; 4. $BiVO_4$/FeOOH composite semiconductor material; 5. carbon paper.

DETAILED DESCRIPTION

The present invention will be further described below with reference to specific examples.

Example 1

In this example, the method for enhanced bio-treatment of refractory organic pollutants with photo-excited holes as electron acceptors comprises the following steps.

Figure 1:
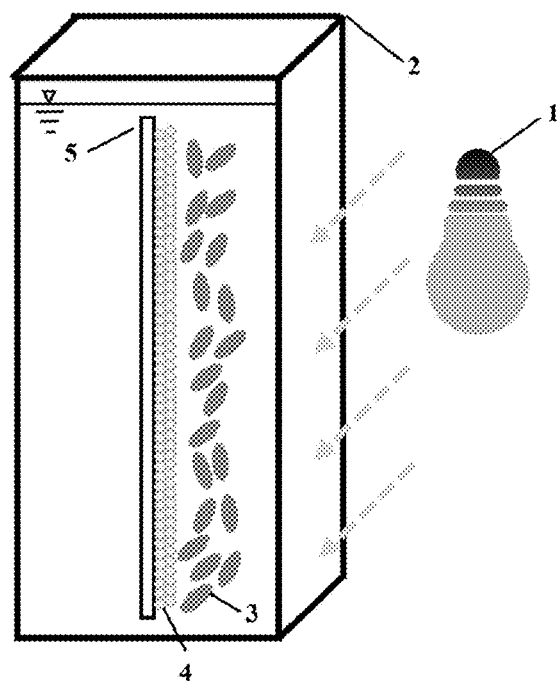
FIG. 1 schematically shows the structure of a photo-excited hole enhanced bioreactor.

FIG. 1 schematically shows the structure of a photo-excited hole enhanced bioreactor. In the enhanced biological system, carbon paper immobilized and loaded with $BiVO_4$/FeOOH composite semiconductor material was immersed in a quartz reactor 2, having a specification of 4.5×4.5×7.5 cm, and a volume of 150 mL.

In the present invention, the $BiVO_4$/FeOOH composite semiconductor material 4 was immobilized on carbon paper carrier (CP, 4×4 cm) by using the immobilization technology of semiconductor materials, to form $BiVO_4$/FeOOH@CP. Then, anaerobic sludge was inoculated into the reactor, and a biological membrane 3 was loaded on the surface of the, $BiVO_4$/FeOOH composite semiconductor by habituated culture of sludge, to construct the photo-excited hole enhanced system.

The specific steps were as follows.

1) Preparation of BiOI@CP: 1.94 g of $Bi(NO_3)_3 \cdot 5H_2O$ and 6.64 g of KI were dissolved in 100 mL of deionized water. The pH was adjusted to 1.7 with nitric acid, and then the solution was mixed with 40 mL of a solution of p-benzoquinone in ethanol (0.23 M) for 5 min. The mixture was added to a three-electrode system, and electrodeposited for 10 min at a cathodic potential of −0.1 V (vs. Ag/AgCl), to electrodeposit BiOI onto CP, so as to form BiOI@CP.

2) Preparation of $BiVO_4$@CP: 1 mL of $VO(acac)_2$/DMSO solution was coated onto BiOI@CP, and heated to 450° C. at a heating rate of 2° C./min for 2 hrs; and excess $V_2O_5$ was removed by treatment for 30 min with 10 M NaOH, to obtain $BiVO_4$@CP.

3) Preparation of $BiVO_4$/FeOOH@CP: The prepared $BiVO_4$@CP was further immersed in 5 mM $FeCl_3 \cdot 6H_2O$ solution for 12 hrs, and rinsed with deionized water.

4) Before the reactor was put into use, anaerobic sludge was inoculated into the quartz reactor, at a mixed liquor suspended solid (MLSS) concentration of 3.0-6.0 g/L, and the semiconductor material was immersed and immobilized in the reactor. After two days, the supernatant was removed, and 125 mL of freshly prepared simulated wastewater was added to the reactor to start a new batch. After at least 30 days of habituated culture, a biological membrane was grown and enriched on the surface of the semiconductor material, and excess suspended sludge in the reactor was removed.

A 150 W LED light 1 was used as a visible light source, and the refractory organic compounds in wastewater were treated by the above enhanced system under irradiation.

The simulated wastewater comprises the following components: organic pollutants, $Na_2HPO_4 \cdot 12H_2O$ 3.06 g/L, $KH_2PO_4$ 0.76 g/L, $MgSO_4 \cdot 7H_2O$ 0.2 g/L, $CaCl_2$ 0.05 g/L, and 1 mL/L mixed solution of trace elements, including $ZnSO_4 \cdot 7H_2O$ 0.01 g/L, $MnCl_2 \cdot 4H_2O$ 0.003 g/L, $H_3BO_3$ 0.03 g/L, $CoCL_2 \cdot 6H_2O$ 0.02 g/L, $CuCl_2 \cdot 2H_2O$ 0.001 g/L, $NiCl_2 \cdot 6H_2O$ 0.002 g/L, and $Na_2MoO_4 \cdot 2H_2O$ 0.003 g/L, EDTA 0.5 g/L, and $FeSO_4 \cdot 7H_2O$ 0.2 g/L. The carbon and nitrogen needed for microbial growth and metabolism in the photo-excited hole enhanced biological system are provided by organic pollutants.

Example 2

This example was substantially the same as Example 1. In actual use, pyridine simulated wastewater was added to the photo-excited hole enhanced biological system, and sequencing batch degradation was performed for a period of two days. The pyridine simulated wastewater contains pyridine, a buffer solution, inorganic salts, and trace elements, etc.

Different reactors were configured according to the method in Example 1, and different experimental groups were set. The reactor configured with blank carbon paper having no biological membrane loaded and configured to run under irradiation was designated as $R_{con}$. The reactor configured with blank carbon paper having a biological membrane loaded and configured to run under irradiation was designated as $R_{bio}$. The reactor configured with a semiconductor material having no biological membrane loaded and configured to run under irradiation was designated as $R_{pho}$. The reactor configured with a semiconductor material having a biological membrane loaded and configured to run without irradiation was designated as $R_{pho-bio-dark}$. The reactor configured with a semiconductor material having a biological membrane loaded and configured to run under irradiation was designated as $R_{pho-bio}$.

Figure 2:
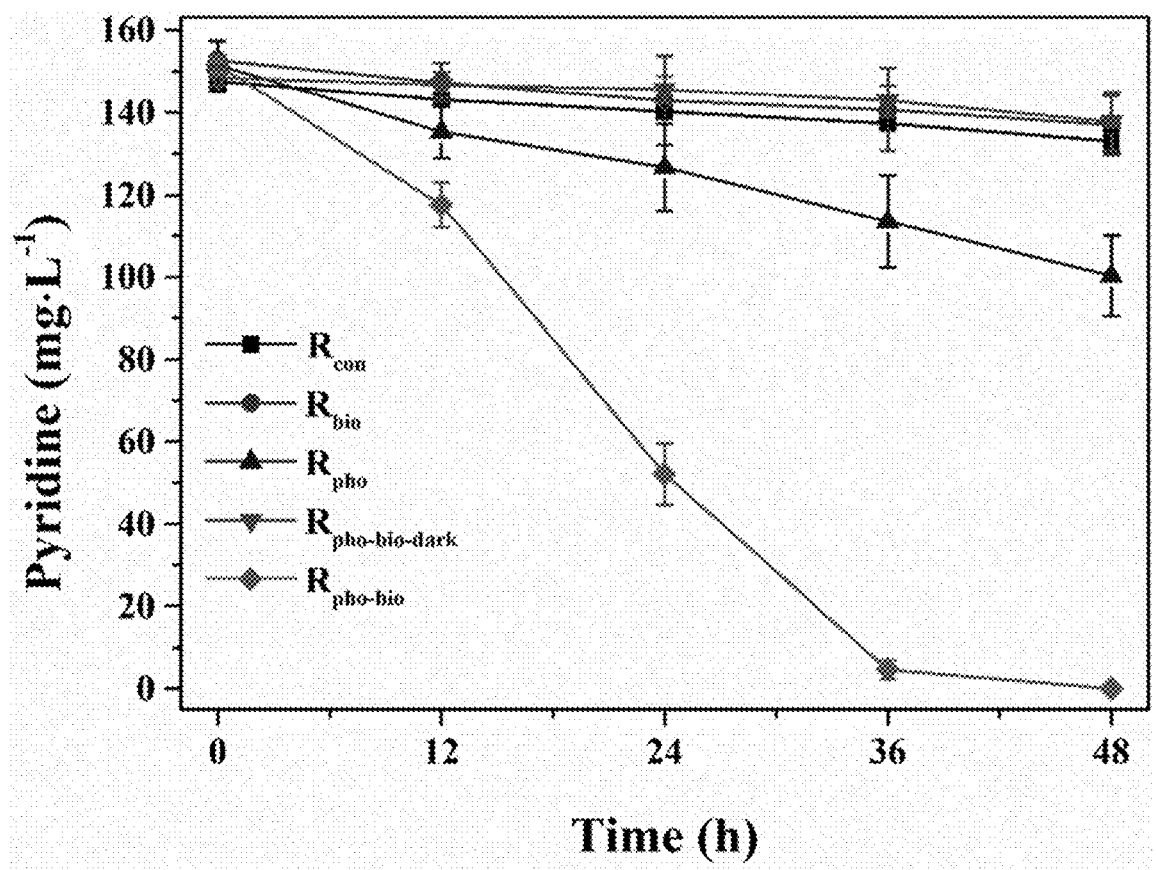
FIG. 2 shows the removal effect on pyridine in different experimental groups.

As shown in FIG. 2, $R_{con}$ and $R_{bio}$ have almost no degradation on pyridine, and the pyridine concentration is only reduced from 150 mg/L to 133 and 137 mg/L. This means that pyridine will not degrade by itself under irradiation, and the biological degradation of pyridine is also negligible. $R_{pho}$ shows obvious removal effect on pyridine, and the pyridine concentration is reduced from 150 mg/L to 100 mg/L. This shows that the semiconductor material $BiVO_4/FeOOH$ used in the present invention has a degradation effect on pyridine under irradiation, but the effect is much less than the removal effect of $R_{pho-bio}$. After two days of degradation, no pyridine is detected in $R_{pho-bio}$, showing that the photo-excited hole enhanced biological system has a significant removal effect on pyridine, due to the synergistic effect between the semiconductor materials and the microorganisms. Therefore, the degradation effect of the enhanced system on pyridine is greatly enhanced. Notably, the pyridine removal effect in $R_{pho-bio-dark}$ is the same as that in $R_{bio}$, suggesting that in the absence of light, the semiconductor material fails to promote the significant degradation of pyridine by microorganisms. This also proves that there is a synergistic effect in the enhanced system.

Figure 3:
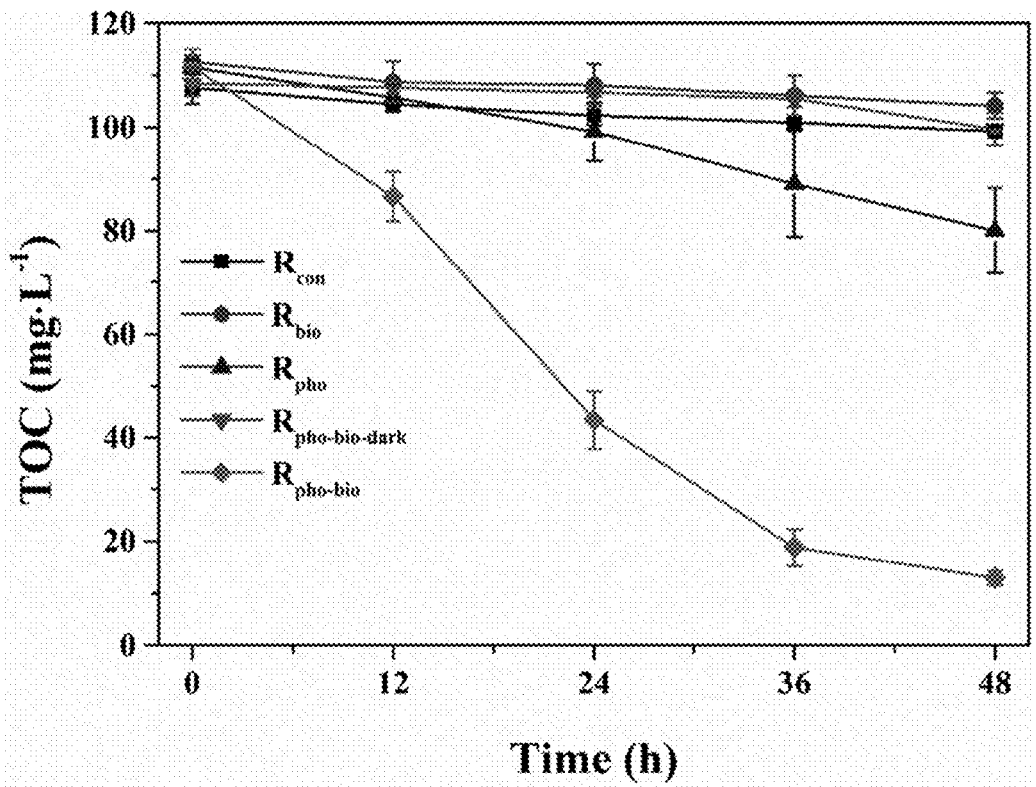
FIG. 3 shows the removal effect on total organic carbon (TOC) in different experimental groups.

FIG. 3 shows the removal effect on total organic carbon (TOC) in different experimental groups. The reactor configured with blank carbon paper having no biological membrane loaded and configured to run under irradiation was designated as $R_{con}$. The reactor configured with blank carbon paper having a biological membrane loaded and configured to run under irradiation was designated as $R_{bio}$. The reactor configured with a semiconductor material having no biological membrane loaded and configured to run under irradiation was designated as $R_{pho}$. The reactor configured with a semiconductor material having a biological membrane loaded and configured to run without irradiation was designated as $R_{pho-bio-dark}$. The reactor configured with a semiconductor material having a biological membrane loaded and configured to run under irradiation was designated as $R_{pho-bio}$.

The removal for total organic carbon (TOC) has the similar trend to that for pyridine removal. As shown in FIG. 3, the removal of TOC by $R_{con}$, $R_{bio}$, and $R_{pho-bio-dark}$ is almost negligible. $R_{pho}$ shows a certain removal effect on TOC, and the TOC concentration is reduced from 110 mg/L to 80 mg/L. $R_{pho-bio}$ shows the most excellent effect in TOC removal, and after two days of degradation, the TOC concentration is reduced from 110 mg/L to 13 mg/L, with a removal efficiency of TOC of up to 88%. This shows that the photo-excited hole enhanced biological system can not only completely remove pyridine, but also maintain a significant mineralization ability.

Figure 4:
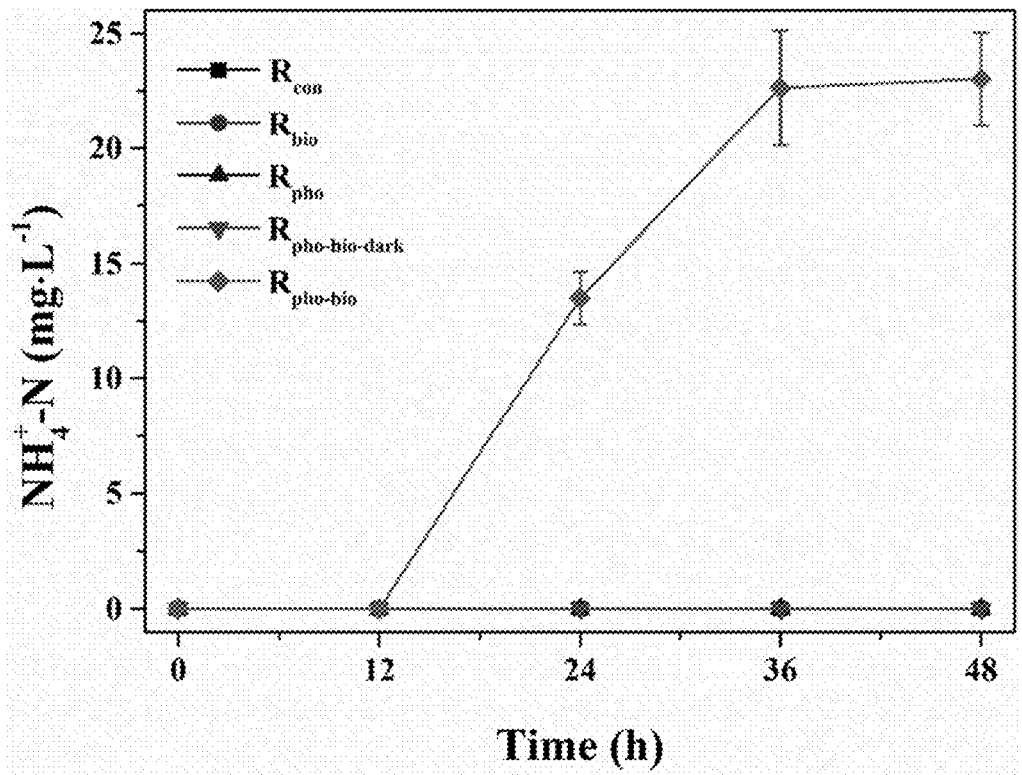
FIG. 4 shows the formation of ammonia nitrogen in different experimental groups.

FIG. 4 shows the formation of ammonia nitrogen in different experimental groups. The reactor configured with blank carbon paper having no biological membrane loaded and configured to run under irradiation was designated as $R_{con}$. The reactor configured with blank carbon paper having a biological membrane loaded and configured to run under irradiation was designated as $R_{bio}$. The reactor configured with a semiconductor material having no biological membrane loaded and configured to run under irradiation was designated as $R_{pho}$. The reactor configured with a semiconductor material having a biological membrane loaded and configured to run without irradiation was designated as $R_{pho-bio-dark}$. The reactor configured with a semiconductor material having a biological membrane loaded and configured to run under irradiation was designated as $R_{pho-bio}$.

The complete degradation of pyridine is usually accompanied by the formation of ammonia nitrogen. Therefore, the formation efficiency of ammonia nitrogen can be used as an important index for the complete degradation of pyridine. As shown in FIG. 4, no formation of ammonia nitrogen is detected during the entire degradation process in $R_{con}$, $R_{bio}$, $R_{pho-bio-dark}$, and $R_{pho}$, further confirming that the degradation effect of $R_{con}$, $R_{bio}$, $R_{pho-bio-dark}$, and $R_{pho}$ is poor. Under irradiation, although the semiconductor can remove pyridine to some extent, the low mineralization rate and incomplete degradation are the main causes limiting its use. After two days of degradation, the concentration of ammonia nitrogen in $R_{pho-bio}$ is up to 23 mg/L, with a formation efficiency of ammonia nitrogen of as high as 84%, indicating that the photo-excited hole enhanced biological system can completely degrade pyridine.

In summary, the photo-excited hole enhanced biological system has a significant removal effect on pyridine, and also maintains a very high mineralization capacity. The photo-excited hole enhanced biological system can completely degrade pyridine, and also overcome the defects of low mineralization efficiency in traditional semiconductor photocatalytic technology and low load and slow degradation in traditional biotechnology. The semiconductor immobilization technology adopted in the present invention solves the problems of high cost and difficult catalyst recovery.

Example 3

In this example, different scavengers were used to explore the effects of photo-excited holes, superoxide radicals and hydroxyl radicals in the photo-excited hole enhanced biological systems.

Figure 5:
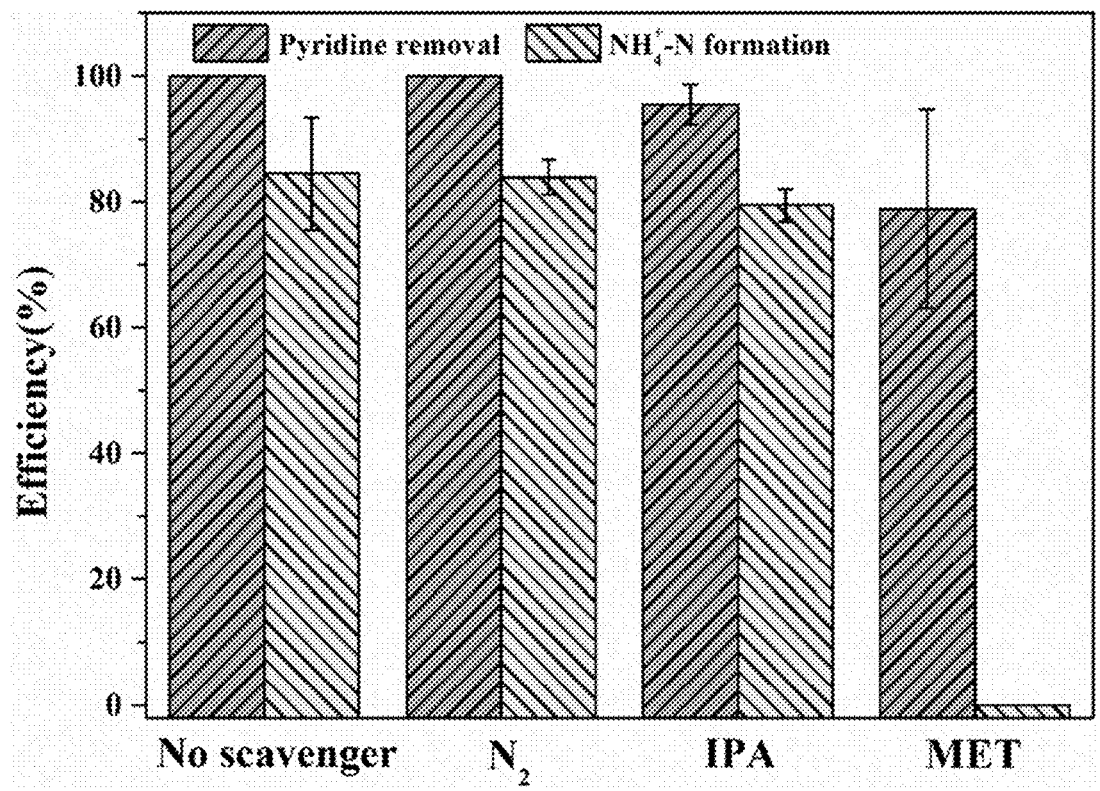
FIG. 5 shows the effect of different scavengers on the degradation effect of the photo-excited hole enhanced biological system.

Upon excitation under irradiation, the semiconductor material generates photo-excited electron-hole pairs, and the photo-excited electron-hole pairs can produce superoxide radicals and hydroxyl radicals through reaction with oxygen and water. As shown in FIG. 5, different scavengers were used to explore the effects of photo-excited holes, superoxide radicals and hydroxyl radicals in the photo-excited hole enhanced biological systems. Methanol (MET) and isopropanol (IPA) acted as scavengers for photo-excited holes and hydroxyl radicals, respectively. To explore the effect of superoxide radicals in the photo-excited hole enhanced biological systems, the solution was purged with nitrogen ($N_2$) for 15 min to ensure the removal of potentially dissolved oxygen from the system. After removing the dissolved oxygen in the system, the effect of the photo-excited hole enhanced biological system on the degradation of pyridine was not suppressed, and the pyridine removal rate and ammonia nitrogen formation were almost unchanged. This indicates that superoxide radicals do not play a role in the photo-excited hole enhanced biological system. When isopropanol was added to the photo-excited hole enhanced biological system, both pyridine removal and ammonia nitrogen generation in the system were slightly inhibited, but the effect was not obvious. This indicates that hydroxyl radicals do not play a main role in the photo-excited hole enhanced biological system. When methanol was added to the photo-excited hole enhanced biological system, both pyridine removal and ammonia nitrogen formation were significantly inhibited, and the pyridine removal rate dropped to 79%. This indicates that the photo-excited hole is an important factor affecting the degradation of pyridine in the photo-excited hole enhanced biological system. Notably, after methanol was added to the photo-excited hole enhanced biological system, no ammonia nitrogen was detected in the system. This indicates that compared to pyridine removal, the photo-excited hole has a higher influence on the formation of ammonia nitrogen (that is, the complete degradation of pyridine). This also indicates that the photo-excited hole is not reacted directly with pyridine. Considering the fact that the biological membrane is loaded on the surface of the semiconductor material, pyridine comes into contact with the biological membrane firstly. In the process of microbial degradation of pyridine, the photo-excited hole acts as an electron acceptor to receive electrons generated during the microbial degradation of pyridine, thereby promoting the degradation of pyridine by microorganisms.

Figure 6:
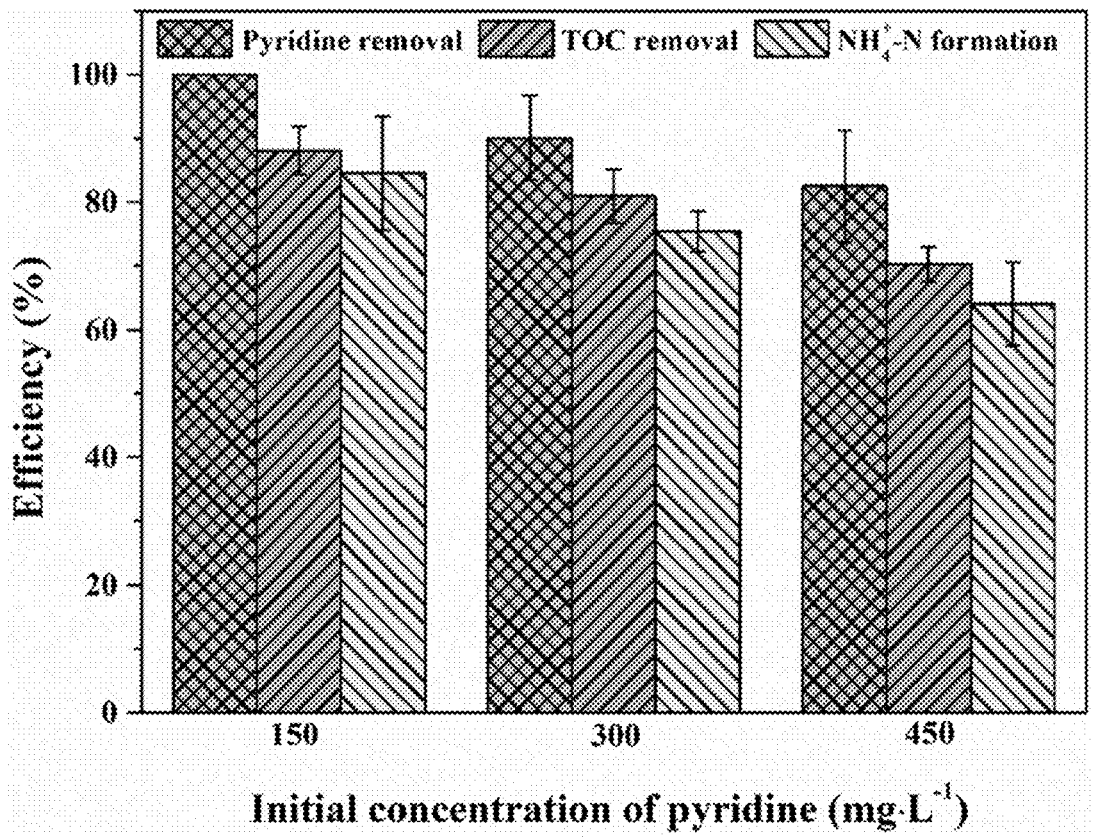
FIG. 6 shows the removal effect of the photo-excited hole enhanced biological system for different concentrations of pyridine.

FIG. 6 shows the removal effect of the photo-excited hole enhanced biological system for different concentrations of pyridine. As shown in FIG. 6, as the pyridine concentration increases, although the degradation performance of the photo-excited hole enhanced biological system is slightly reduced, when the pyridine concentration is as high as 450 mg/L, the system can still maintain a high degradation performance (with a pyridine removal efficiency of 82%, a TOC removal efficiency of 70% and an ammonia nitrogen formation efficiency of 64%). These results indicate that the photo-excited hole enhanced biological system has excellent load resistance, and the system will not break down even at a high concentration of pyridine, where the highest treatment capability is up to 2.34 mol $m^{-3} \cdot d^{-1}$. The load resistance of the photo-excited hole enhanced biological system allow the system to adapt to the complex and variable industrial wastewater, making it have great potential in the treatment of practical industrial wastewater.

Example 4

This example was substantially the same as Example 1. In actual use, CdS/g-$C_3N_4$@AGF was immobilized in a reactor, then chlorophenol simulated wastewater was added to the photo-excited hole enhanced biological system, and sequencing batch degradation was performed for a period of two days. The chlorophenol simulated wastewater contains chlorophenols, a buffer solution, inorganic salts, and trace elements, etc.

In $R_{con}$, $R_{bio}$, and $R_{pho-bio-dark}$, the removal of chlorophenol and TOC is almost negligible. This indicates that chlorophenol itself can exist stably under light and cannot be biodegraded. The semiconductor material has no effect on the degradation of chlorophenol in the absence of light. The removal rate of chlorophenol in $R_{pho}$ is up to 84%, suggesting that under the catalysis of semiconductor material, the structure of chlorophenol is destroyed. However, the removal rate of TOC is merely 28%, suggesting that chlorophenol cannot be mineralized by the catalytic effect of the semiconductor material alone, and only organic compounds derived therefrom can be obtained. The removal rates of chlorophenol and TOC in $R_{pho-bio}$ are as high as 96% and 78%, respectively. This shows that the photo-excited hole enhanced biological system has a significant removal effect on chlorophenols, and also maintains a very high mineralization capacity.

Example 5

This example was substantially the same as Example 1. In actual use, $BiVO_4$/g-$C_3N_4$@GF was immobilized in a reactor, then tetracycline simulated wastewater was added to the photo-excited hole enhanced biological system, and sequencing batch degradation was performed for a period of two days. The tetracycline simulated wastewater contains tetracycline, a buffer solution, inorganic salts, and trace elements, etc.

The removal rate of tetracycline in $R_{con}$ is merely 12%, and the TOC concentration keeps unchanged during the degradation process. The mild removal of tetracycline is attributed to the adsorption of tetracycline by the conductive carrier. In $R_{bio}$, and $R_{pho-bio-dark}$, the removal efficiency of tetracycline are 53% and 55%, respectively, and the removal of TOC is almost negligible. This shows that tetracycline can be biodegraded; however, the efficiency of biodegradation is very limited. The semiconductor material has no effect on the degradation of tetracycline in the absence of light. The removal rate of tetracycline in $R_{pho}$ reaches 78%, suggesting that under the catalysis of semiconductor material, the structure of tetracycline is destroyed. However, the removal rate of TOC is merely 17%, suggesting that tetracycline cannot be mineralized by the catalytic effect of the semiconductor material alone, and only organic compounds derived therefrom can be obtained. The removal rates of tetracycline and TOC in $R_{pho-bio}$ are as high as 91% and 68%, respectively. This shows that the photo-excited hole enhanced biological system has a significant removal effect on tetracycline, and also maintains a high mineralization capacity.

Examples 4 and 5 show that the excellent degradation ability of the photo-excited hole enhanced biological system can adapt to industrial wastewater with complex components. Undoubtedly, it has broad prospects in industrial wastewater treatment.

The above embodiments are provided to facilitate the understanding of the present invention, instead of limiting the present invention. Apparently, various modifications can be easily made by those skilled in the art to these embodiments, and the general principles illustrated here are applicable to other embodiments without creative efforts. Therefore, any modifications, equivalent replacements, and improvements made without departing from the principle of the present invention are embraced in the protection scope of the present invention.

What is claimed is:

1. A method for enhanced bio-treatment of refractory organic pollutants with photo-excited holes as electron acceptors, comprising the following steps:
   1-1) placing a composite semiconductor-coated carrier material into a reactor, introducing wastewater into the reactor inoculated with anaerobic sludge, and allowing the composite semiconductor-coated carrier material to be immersed in the wastewater, wherein the composite semiconductor-coated carrier material comprises a conductive carrier and composite semiconductor materials loaded on the conductive carrier, wherein the composite semiconductor materials comprise $BiVO_4/FeOOH$;
   1-2) carrying out habituated culture on the anaerobic sludge for a period of time, and loading a biological membrane on a surface of the composite semiconductor-coated carrier material, to construct a photo-excited hole-enhanced bioreactor; and
   1-3) treating the refractory pollutants in the wastewater by utilizing the reactor under irradiation,
   wherein the conductive carrier comprises carbon paper, and the reactor comprises a quartz reactor or a glass reactor,
   wherein the composite semiconductor-coated carrier material comprises $BiVO_4/FeOOH@CP$, and
   wherein the $BiVO_4/FeOOH@CP$ is prepared through a method comprising: preparing BiOI@CP by electrodeposition, converting the BiOI@CP into $BiVO_4$@CP, immersing the $BiVO_4$@CP in a solution of $FeCl_3 \cdot 6H_2O$ for a period of time, and rinsing with deionized water, to obtain the $BiVO_4/FeOOH@CP$.

2. The method for enhanced bio-treatment of refractory organic pollutants with photo-excited holes as electron acceptors according to claim 1, wherein the anerobic sludge is inoculated at a concentration of about 3.0-6.0 g/L, and the anaerobic sludge is subjected to habituated culture for at least 30 days.

3. The method for enhanced bio-treatment of refractory organic pollutants with photo-excited holes as electron acceptors according to claim 1, wherein the electrodeposition comprises the following steps:
   7-1) dissolving $Bi(NO_3)_3 \cdot 5H_2O$ and KI in deionized water; adjusting the pH with nitric acid, and mixing the solution with a solution of p-benzoquinone in ethanol for a period of time, to obtain a mixture; and
   7-2) adding the mixture to a three-electrode system, and electrodepositing at a cathodic potential for a period of time, to deposit BiOI onto carbon paper, so as to form the BiOI@CP.

4. The method for enhanced bio-treatment of refractory organic pollutants with photo-excited holes as electron acceptors according to claim 3, wherein the BiOI@CP is converted into the $BiVO_4$@CP through steps comprising:
   8-1) coating a $VO(acac)_2$/DMSO solution onto the BiOI@CP, heating to a certain temperature at a certain heating rate and holding for a period of time; and
   8-2) treating with NaOH to remove excess $V_2O_5$, to obtain the $BiVO_4$@CP.

5. The method for enhanced bio-treatment of refractory organic pollutants with photo-excited holes as electron acceptors according to claim 1, wherein the wastewater comprises refractory organic pollutants, $Na_2HPO_4 \cdot 12H_2O$, $KH_2PO_4$, $MgSO_4 \cdot 7H_2O$, $CaCl_2$, and a mixed solution of trace elements.

6. The method for enhanced bio-treatment of refractory organic pollutants with photo-excited holes as electron acceptors according to claim 5, wherein the refractory organic pollutants comprise nitrogen-containing heterocyclic organic compounds, chlorinated organic compounds and antibiotic organic compounds.

7. The method for enhanced bio-treatment of refractory organic pollutants with photo-excited holes as electron acceptors according to claim 2, wherein the electrodeposition comprises the following steps:
   7-1) dissolving $Bi(NO_3)_3 \cdot 5H_2O$ and KI in deionized water; adjusting the pH with nitric acid, and mixing the solution with a solution of p-benzoquinone in ethanol for a period of time, to obtain a mixture; and
   7-2) adding the mixture to a three-electrode system, and electrodepositing at a cathodic potential for a period of time, to deposit BiOI onto carbon paper, so as to form the BiOI@CP.

* * * * *